3,465,030
PROCESS FOR THE PRODUCTION OF DIALLYL-PHTHALATE
Ernst Leumann, Arlesheim, and Daniel Porret, Binningen, Switzerland, assignors to Ciba Limited, Basel, Switzerland, a company of Switzerland
No Drawing. Continuation-in-part of application Ser. No. 372,694, June 4, 1964. This application Feb. 27, 1968, Ser. No. 708,519
Claims priority, application Switzerland, June 18, 1963, 7,566/63
Int. Cl. C07c *67/04, 67/00*
U.S. Cl. 260—475                                              1 Claim

ABSTRACT OF THE DISCLOSURE

The invention relates to a two stage process for the manufacture of diallyl-ortho-phthalate in non-pressure apparatus, wherein in the first stage about 1 mol of phthalic anhydride is reacted with about 1 to 1.05 mol of allyl alcohol at reflux temperature and at atmospheric pressure, to yield the mono-allyl-ester of ortho-phthalic acid, and wherein in a second reaction stage, the semi-ester formed in the first stage is reacted with a stoichiometric excess of allyl chloride to form the diallyl-ortho-phthalate, said second reaction stage being carried out at reflux and atmospheric pressure in a reaction medium to which about 0.5 to 0.55 mol of anhydrous sodium carbonate for 1 mol of the said semiester, and further a catalyst selected from the group consisting of tertiary amines and quaternary ammonium salts thereof have been added, said catalyst being at least partially soluble in the reaction medium, and the excess allyl chloride is recovered by distillation after completion of the reaction.

---

This is a continuation-in-part application of our copending application Ser. No. 372,694, filed June 4, 1964, now abandoned.

This invention relates to an improved two-stage process for the preparation of diallyl-ortho-phthalate.

It has been proposed to prepare diallyl phthalates by direct esterification of phthalic acid or anhydride with allyl alcohol. In this known process an excess of the relatively expensive allyl alcohol is required to complete the reaction and to compensate for alcohol lost through by-product ether formation and through polymerization of the alcohol at the necessary prolonged processing times at elevated temperatures.

It has further been proposed to react the relatively inexpensive allyl chloride with metal salts of phthalic acids in the presence of a tertiary amine catalyst in both aqueous and anhydrous systems. The requirement in this process for initial preparation of the phthalate salt from the free phthalic acid, before actual esterification, is however accompanied by serious disadvantages: in anhydrous systems, the process of preparing the anhydrous metal phthalate is time consuming, since the salt must be prepared in aqueous solution, and subsequently dried, and requires special equipment due to corrosion problems. If the metal phthalate is prepared and used in aqueous medium, substantial decomposition of the allyl chloride in the subsequent esterification may occur due to its instability in the presence of water.

In order to overcome the above disadvantages, it has been proposed in United States patent specification Ser. No. 3,086,985 to prepare diallyl phthalates in a one step process from an allylic halide without the intermediate preparation of the metal phthalate by reacting phthalic anhydride with equivalent amounts of sodium carbonate and an allylic halide, such as allyl chloride or allyl bromide under substantially anhydrous conditions, employing a tertiary amine catalyst.

This process however has the serious drawback, that it can be carried out with acceptable yields at atmospheric pressure only if the expensive allyl bromide is used as the allylic halide; if instead, the cheap allyl chloride is used, yields of diallyl-ortho-phthalate as low as about 6% are obtained. In order to obtain good yields of diallyl-ortho-phthalate using phthalic anhydride and allyl chloride in the process described in U.S. Patent No. 3,086,985, it is necessary to perform the reaction under superatmospheric pressure; this requires the use of expensive autoclave equipment which renders the process economically unattractive.

It has now surprisingly been found, that the disadvantages inherent in the known process can be overcome by a two-stage procedure in a very simple manner: in a first stage 1 mol of phthalic anhydride is reacted with about 1 mol of allyl alcohol to form the semiester. As sharply contrasted with the direct formation of the diester from phthalic anhydride and allyl alcohol, the semi-ester formation proceeds smoothly and in excellent yield. No excess allyl alcohol is required, and no alcohol is lost through by-product formation. In the second step, the formed semi-ester is reacted with an excess of allyl chloride in the presence of an equivalent amount of sodium carbonate, employing a tertiary amine or quaternary ammonium salt thereof as catalyst. This second reaction step proceeds smoothly and in excellent yield of over 90% at reflux and atmospheric pressure. This is highly surprising, since extremely low yields of as low as 6% are obtained, if phthalic anhydride or phthalic acid respectively instead of mono-allyl-ortho-phthalic ester are reacted under otherwise exactly identical conditions with allyl chloride according to the teachings of the prior art (U.S. Patent 3,086,985).

It is true, that the formation of the semi-ester in the first stage from 1 mol of an acid anhydride and 1 mol of an alcohol is a chemical standard procedure, which is generally described in text books of organic chemistry, such as e.g. Migrdichian "Organic Synthesis," vol. I, N.Y. (1957), page 323. However from this knowledge the chemist could not derive the surprising teaching of this invention, namely that by taking the apparent detour over the mono-allyl-ortho-phthalic acid instead of reacting phthalic anhydride directly with allyl chloride, it is possible to obtain nearly quantitative yields although working at atmospheric pressure and in simple and unexpensive equipment in both process stages.

Accordingly the instant invention provides a two stage process for the manufacture of diallyl-ortho-phthalate in non-pressure apparatus, wherein in the first stage about 1 mol of phthalic anhydride is reacted with about 1 to 1.05 mol of allyl alcohol at reflux temperature and at atmospheric pressure, to yield the mono-allyl-ester of ortho-phthalic acid, and wherein in a second reaction stage, the semi-ester formed in the first stage is reacted with a stoichiometric excess of allyl chloride to form the diallyl-ortho-phthalate, said second reaction stage being carried out at reflux and at atmospheric pressure in a reaction medium to which about 0.5 to 0.55 mol of anhydrous sodium carbonate for 1 mol of the said semi-ester, and further a catalyst selected from the group consisting of tertiary amines and quaternary ammonium salts thereof have been added, said catalyst being at least partially soluble in the reaction medium, and the excess unreacted allyl chloride is recovered by distillation after completion of the reaction.

During the second reaction stage the temperature in the reaction medium is higher than can ever be reached during the known single-stage process from phthalic anhydride and allyl-chloride with anhydrous sodium carbonate and in the presence of a tertiary amine as catalyst. Whereas in the single-stage process the reaction temperature is only little above 50° C., it rises in the present process, as the rate of conversion increases, from about 60° C. at the outset to about 100° C. towards the end of the reaction.

The clear technical advantages of the process of the invention are, that the present process can be performed under atmospheric pressure, and that in addition there is the advantage that only half the quantity of expensive allyl alcohol is needed compared with its consumption in the known direct esterification of phthalic anhydride with allyl alcohol.

The tertiary amine or quaternary salt thereof which is used as catalyst may be any that is at least partially soluble in the reaction medium. Lower trialkyl amines, such as triethylamine are preferred. The tertiary amine or quaternary salt thereof is used in catalytic amounts.

Both stages of the present process may be carried out in the presence of an inert organic diluent, more especially toluene.

The diallyl-ortho-phthalate prepared by the process of this invention is a useful monomer for the preparation of synthetic resins, and may be polymerized or copolymerized to form fusible prepolymers having residual unsaturation; prepolymers of this kind (which are e.g. sold under the registered trademark "Dapon") can be cured to cross-linked resins having good electrical and mechanical properties.

Percentages in the following examples are by weight.

Example 1

A mixture of 148 g. (1 mol) of phthalic anhydride and 61 g. (1.05 mols) of allyl alcohol was heated for 3 hours in a 500 ml. three-necked flask equipped with stirrer, thermometer and reflux condenser in an oil bath of 120° C.; during this time the reaction rose temporarily to over 130° C. and then dropped again. The whole was then cooled, the reflux condenser connected with a water separator, and 76.5 g. (1 mol) of allylchloride were added. While cooling the flask with ice water, 58 g. (0.52 mol) of 95% sodium carbonate and then 5 ml. of triethylamine were added. The mixture was then heated in an oil bath to refluxing, whereupon carbon dioxide was split off. When most of the latter had escaped, another 76.6 g. (1 mol) of allylchloride were added in the course of 2 hours, and the reaction mixture, which meanwhile had become viscid, was refluxed for a total of 24 hours during which the water formed was separated.

During this operation the internal temperature rose gradually from about 60° C. when all allylchloride had been added, to 100° C. at the completion of the reaction. The whole was then cooled, 200 ml. of water was added to dissolve the salt, the batch was adjusted to pH 7.5 with 2 ml. of 30% sodium hydroxide solution, and the excess allylchloride was then distilled off azeotropically with water. The diallyl-ortho-phthalate formed was separated from the aqueous phase after cooling and then distilled, to yield 234 g. of a water-clear liquid boiling at 108–109° under 0.01 mm. Hg pressure; it had an iodine number of 206 (theory: 207), corresponding to a yield of 91.2%.

Example 2

This example shows, that when the reaction of phthalic anhydride and allyl chloride is carried out as single step process according to the teaching of United States Patent 3,086,985, with the exception that the reaction is performed under atmospheric pressure and not in an autoclave as in Example 2 of U.S. Patent 3,086,985, an unacceptable low yield is obtained; during the whole reaction time the internal temperature did not rise above a maximum of 54° C.

A mixture of 148 g. (1 mol) of phthalic anhydride, 153 g. (2 mols) of allylchloride, 110 g. (1 mol) of 96.3% sodium carbonate and 5 ml. of triethylamine was refluxed for 50 hours in the apparatus described in Example 1. 200 ml. of water were then added, whereupon the reaction mixture began to froth strongly owing to the presence of unreacted sodium carbonate left. Another 600 ml. of water were then added and the reaction mixture neutralized with sodium hydroxide. The organic phase was then isolated and distilled, to yield 48 g. of allylchloride, leaving a residue of 15 g. of crude diallyl-ortho-phthalate, which corresponds to a yield of 6.1%. From the aqueous phase there were recovered after acidification without processing the mother liquor, 133 g. of unesterified ortho-phthalic acid, that is to say 80.2% of the initially used phthalic anhydride.

We claim:
1. A two stage process for the manufacture of diallyl-ortho-phthalate in non-pressure apparatus, wherein in the first stage about 1 mol of phthalic anhydride is reacted with about 1 to 1.05 mol of allyl alcohol at reflux temperature and at atmospheric pressure, to yield the mono-allyl-ester of ortho-phthalic acid, and wherein in a second reaction stage, the semi-ester formed in the first stage is reacted with a stoichiometric excess of allyl chloride to form the diallyl-ortho-phthalate, said second reaction stage being carried out at reflux and at atmospheric pressure in a reaction medium to which about 0.5 to 0.55 mol of anhydrous sodium carbonate for 1 mol of the said semiester, and further a catalyst selected from the group consisting of tertiary amines have been added, said catalysts being at least partially soluble in the reaction medium, and the excess allyl chloride is recovered by distillation after completion of the reaction.

References Cited

UNITED STATES PATENTS 3,086,985   4/1963   Stange et al. _____ 260—475
3,250,801   5/1966   Stange et al. _____ 260—468

OTHER REFERENCES

Migrdichian: "Organic Synthesis," vol. I, Reinhold, N.Y., 1957, p. 323.

JAMES A. PATTEN, Primary Examiner

E. JANE SKELLY, Assistant Examiner